Sept. 12, 1933.　　　　　P. A. BORDEN　　　　　1,926,190
TIME CYCLE CONTROLLER
Filed June 18, 1932　　　5 Sheets-Sheet 3

INVENTOR
PERRY A. BORDEN
BY
ATTORNEY

Sept. 12, 1933.     P. A. BORDEN     1,926,190
TIME CYCLE CONTROLLER
Filed June 18, 1932     5 Sheets-Sheet 4
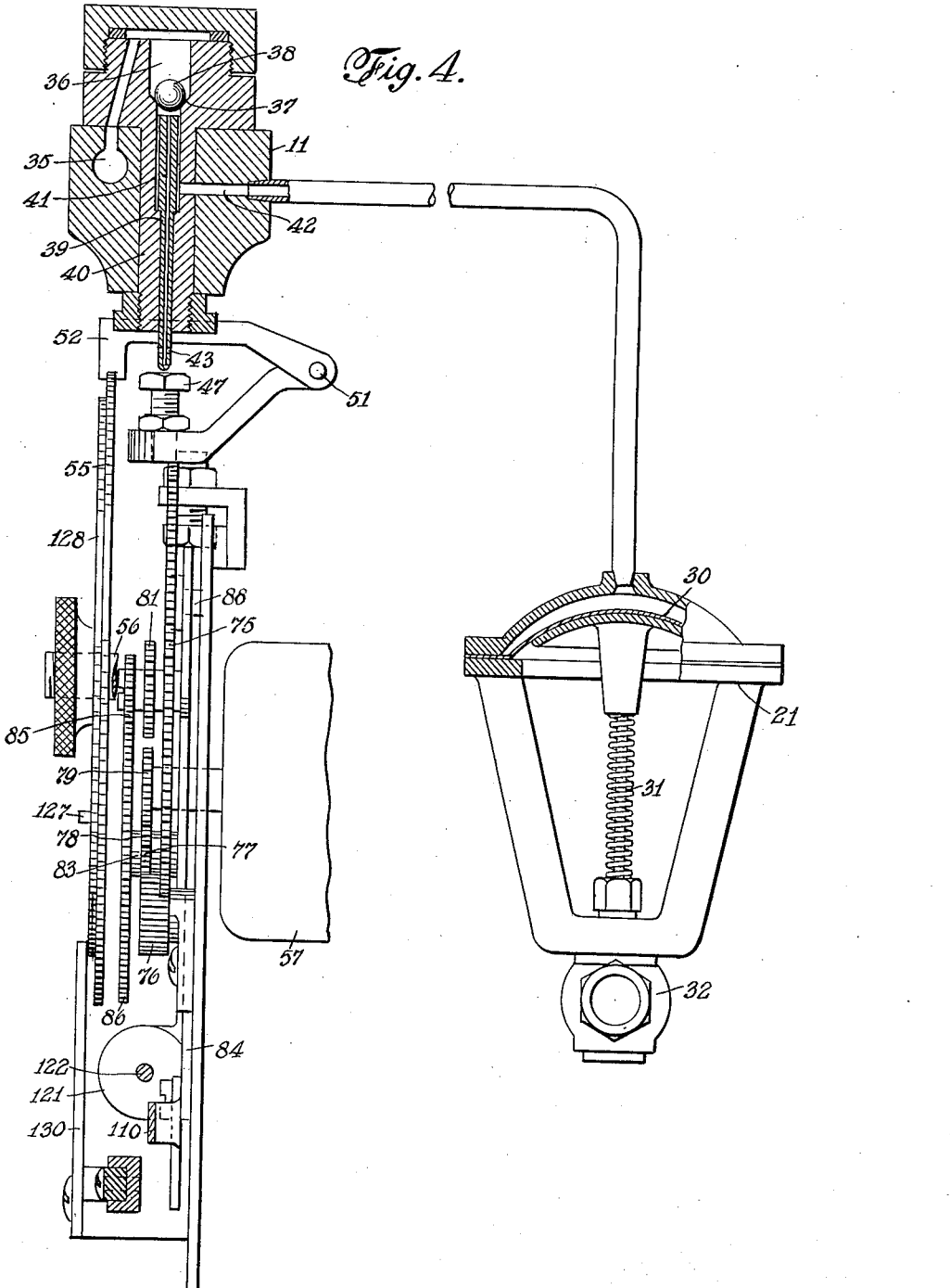
Fig. 4.
INVENTOR
PERRY A. BORDEN
BY
ATTORNEY Sept. 12, 1933. P. A. BORDEN 1,926,190
TIME CYCLE CONTROLLER
Filed June 18, 1932  5 Sheets-Sheet 5
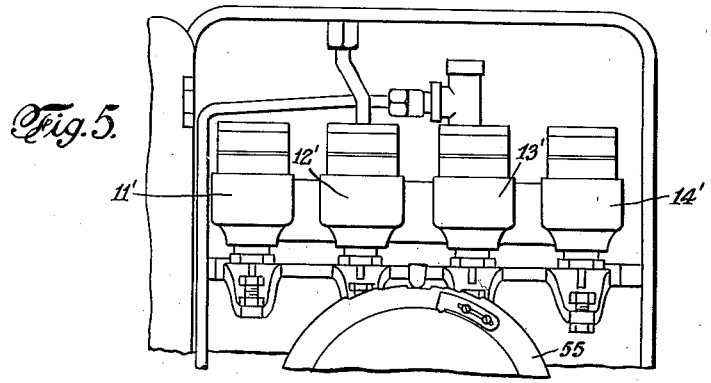
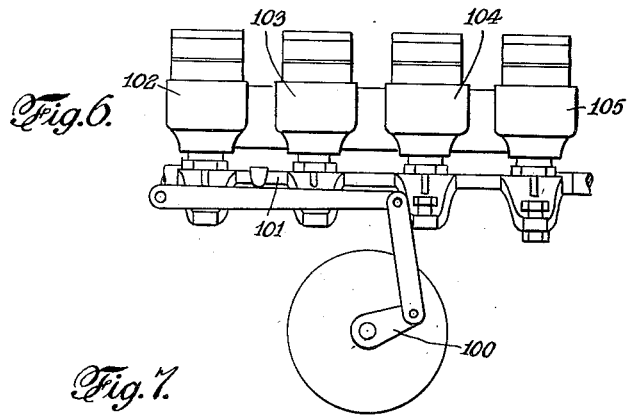
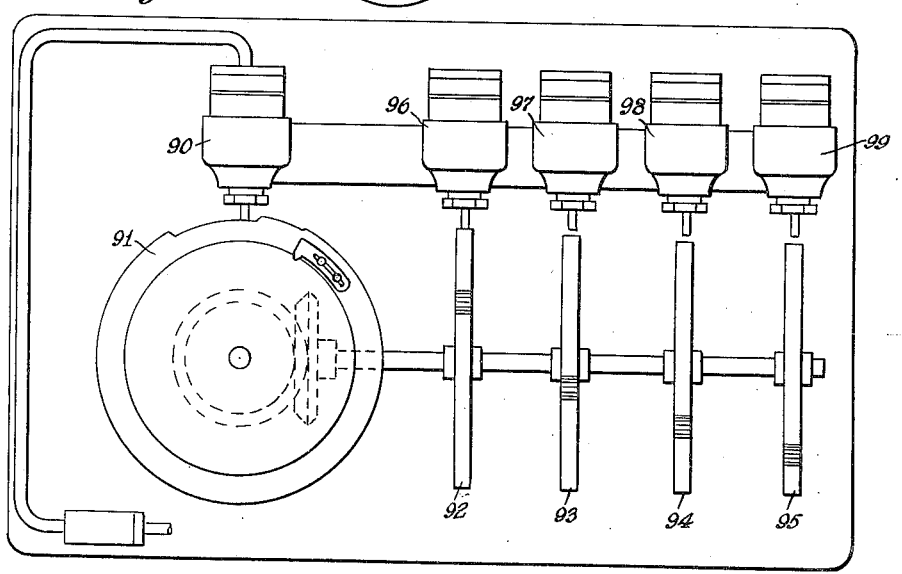
INVENTOR
PERRY A. BORDEN
BY
ATTORNEY Patented Sept. 12, 1933

1,926,190

UNITED STATES PATENT OFFICE 1,926,190

TIME-CYCLE CONTROLLER

Perry A. Borden, Waterbury, Conn., assignor to The Bristol Company, Waterbury, Conn., a corporation of Connecticut Application June 18, 1932. Serial No. 617,966

15 Claims. (Cl. 137—145)

The invention relates to time-cycle control apparatus whereby an automatic control is had of discontinuous processes, for example, such as utilize mechanisms operated by fluid agencies or by electrical energy and wherein the flow of such operating medium to these mechanisms is controlled primarily by relatively small valves or pilot means and the like which are under the control of a cam or group of cams or equivalent mechanism driven by a low-power motor.

The present invention has for an object the provision of novel means for affording an adjustment of the relative times of occurrence of the several events entering into a complete cycle of operations of the process or machine under control. Such adjustment of the total time of the cycle to meet the needs of varying conditions of production presents a difficult problem in that positive and continuously variable speed transmissions are disproportionately expensive, while selective-speed gear trains are limited in the number of settings available, the complications and cost involved as the number of speeds increase becoming prohibitive.

The invention has for a still further object the provision of simple and readily manipulated means, whereby the total time of the process cycle may be adjusted to any desired value within the range of the instrument; and another object of the invention resides in the provision of a graduated dial forming part of the instrument and from which the value of the time interval desired may be read and selected.

Another object of the invention resides in the provision of mechanism for effecting the aforementioned adjustment in such a manner that the relative timing of certain events in the cycle, for example, those at the beginning and at the end of the process, is fixed, the variable element being introduced only between these events. That is to say, there may be interposed between certain of the events which characterize the beginning of the cycle and certain of the events which characterize the termination of the cycle, a time interval during which the velocity of the cam differs from its velocity at the beginning and at the end of the cycle. The invention contemplates, also, other variations in the timing of the different events constituting a cycle.

In carrying out the invention, means are provided whereby the total time of the cycle is divided into intervals during which the controlling mechanism may operate at different velocities, and provision is further made for adjusting the relative values of these time intervals to control the total time of the cycle. That is to say, a substantially continuously rotating cam element is provided for controlling the different operations of a cycle and and provision is made for changing its rotational velocity during an adjustable interval.

The nature of the invention, however, will best be understood when described in connection with the accompanying drawings, in which:

Fig. 4 is a vertical section through a pilot valve and part vertical section of a fluid control valve connected therewith, and an end elevation of the pilot valve operating means.

Fig. 5 is a fragmentary front elevation illustrating a modification in the period of actuation of the throwover from high speed to low speed.

Fig. 6 is a fragmentary view of a modification in the controller actuating means.

Fig. 7 illustrates a further modification in the controller actuating means.

Figure 1:
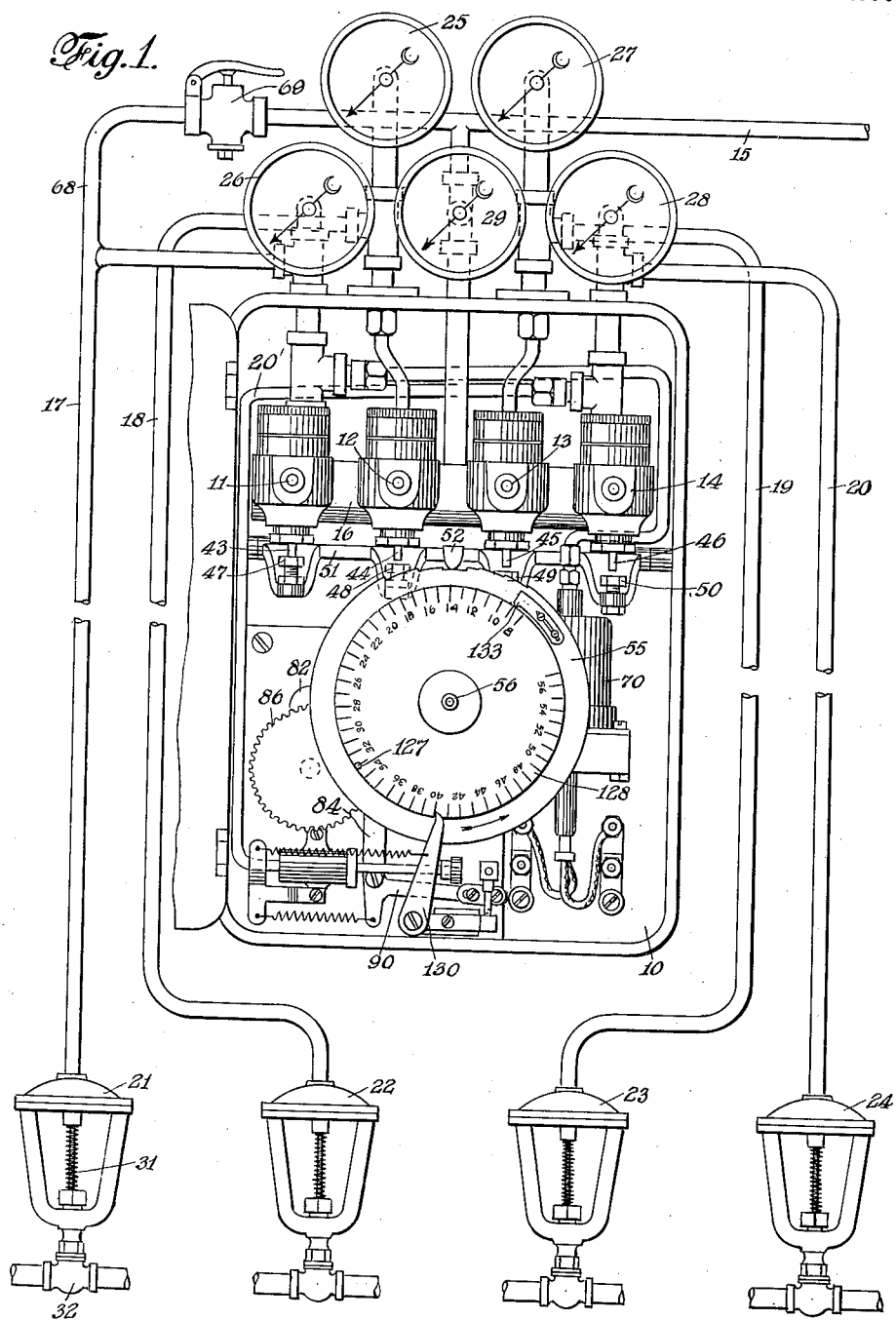
Fig. 1 is a front elevation of the time-cycle control apparatus, suitably encased and with the door of the casing shown open and partly broken away; also, with the connections from the apparatus to fluid controlling valves.

Referring to the drawings, 10 designates a suitable enclosing casing housing the time-cycle control apparatus and the pilot valves 11, 12, 13 and 14, which are controlled thereby. These pilot valves, in any well-known or special manner, are adapted to furnish to the desired control valves an actuating fluid which is supplied thereto from the feed or supply pipe 15 and manifold 16, through outlet pipes 17, 18, 19 and 20 extending from the respective pilot valves 11, 12, 13 and 14, for example, to fluid control valves 21, 22, 23 and 24.

While but four of these pilot valves and associated control valves are indicated, it will, of course, be understood that the invention is not restricted to the number of these valves which depends upon the number of operations it is desired to control. Each supply pipe 17, 18, 19 and 20, furthermore, may be provided with a suitable pressure gauge as the gauges 25, 26, 27 and 28, respectively, and a pressure gauge 29 may be included in the feed or supply pipe 15.

Any suitable type of pilot valve may be employed for the purpose as well as any suitable type of the fluid control valve; and the valve 21, shown in Fig. 4 of the drawings, affords a satisfactory means for the latter purpose.

Such valve is provided with the flexible diaphragm 30 in its head and to which the pressure from the corresponding pilot valve 11 is introduced when the latter valve is opened under the action of the control mechanism hereinafter described. Diaphragm 30 actuates a stem 31 of a valve disk or the like (not shown) for controlling the flow of a fluid through the valve body 32 as is well understood.

As a particularly satisfactory form of pilot valve for the purpose, the valve 11 shown in Fig. 4 may be utilized, the same being substantially similar to the one described in my copending application for U. S. Letters Patent, Serial No. 565,033, filed September 25, 1931. The inlet 35 to this valve communicates with a valve chamber 36 having the seat 37 and upon which rests a sealing ball 38. This ball is adapted to be lifted off its seat by means of a tubular stem 39 slidably mounted in the valve body 40 and affording about the upper portion of its periphery a surrounding chamber 41 which communicates with the outlet 42 from the valve.

Said stem, moreover, is provided with an outlet or a vent 43 at its lower end, which end is adapted to be engaged by the control mechanism hereinafter set forth for elevating the stem to unseat the ball 38 and simultaneously therewith close the vent at its upper end through engagement of the ball with the top of said stem, all of which is more fully set forth in my aforesaid copending application. This freely movable stem and the valve element arrangement affords a full opening for the flow of the actuating fluid with the first small increment of lift of the valve off its seat; and the further lifting of the stem has no material effect on the opening. The respective valve elements may therefore be forced upwardly for a considerable distance after the first opening has taken place.

To elevate the stems of the respective pilot valves 11, 12, 13, and 14 in the desired sequence, the following cam mechanism is provided.

Each of the stems 43, 44, 45 and 46 of the respective pilot valves is adapted to be engaged by respective tappets 47, 48, 49 and 50 which are adjustably mounted upon a rocker arm 51. The latter carries a cam follower 52 designed to engage the periphery of a cam 55 mounted to rotate with the shaft 56 which is driven from an electric motor 57 through intermediate mechanism. The said cam is stepped at a portion of its periphery, for example as at 60, 61, 62 and 63, the latter representing the smallest radius. Further steps 64 and 65, 66 and 67, in the reverse order, are provided at an adjacent portion of the periphery with greatest radius at the portion 67 and equal to the radius of portion 60, while the portion 63 intermediate the two sets of cams constitutes the rest portion. These sets of cams correspond, respectively, to the initiating and terminal operations involved in a complete cycle, the intermediate high portion accommodating the main operation or period of principal activity and in which a variation in duration is desirable.

In accordance with the position of the follower 52 relatively to these stepped portions of the cam will the rock shaft be positioned for causing the tappets carried thereby to engage the different stems of the pilot valves, all of which is well understood and forms no particular part of the present invention. The invention, however, is concerned more especially with the arrangement for adjusting the angular velocity of the cam during the period that is represented by the portion between the two sets of stepped elements.

When the follower 52 rests upon the portion 63 of minimum radius the arrangement is such that the motor 57 will be at rest and no rotation of the cam is effected. As a convenient means of initiating the operations through starting of the motor 57, a by-pass connection 68 may be taken around the pilot valve 11 through the provision of a manually operable feed valve 69 connected to the feed pipe 15 and by-pass. This valve is maintained open for a period sufficiently long to enable the follower to reach the first step 64 of the cam, whereupon the valve 69 is again closed and continued so throughout the remainder of the cycle. By thus by-passing the pilot valve 11, fluid pressure is directed to a pressure-operated switch 70 designed to close the motor circuit of motor 57.

As the cam rotates under the action of motor 57 and intermediate mechanism, the steps 64, 65, 66 and 67 will successively engage the follower 52 to open thereby the respective pilot valves 11, 12, 13 and 14, it being understood that this period in the cycle of operations is effected, preferably, at the highest speed of rotation of the cam. However, as soon as the high portion 67 engages the follower, it is possible to vary the rotational velocity of the cam; and, in the present embodiment, this is effected automatically through the opening of the pilot valve 14 and in the manner hereinafter more fully set forth. Any of the said pilot valves, however, may be arranged to effect such change over to a different speed. Thus, as indicated in Fig. 5, the pilot valve 13' of the respective valves 11', 12', 13' and 14' may be utilized rather than the last valve 14' as in the arrangement hereinbefore described.

The length of the period of this changed (slower) angular velocity will be determined by the setting device hereinafter more fully described and which admits of adjustment, say in one-minute periods, over a large range of the high portion of the cam, whereupon the rotational velocity of the cam returns to its initial higher speed.

In its normal and in the initiating and terminal operations, the cam is rotated at the higher speed from motor 57 through a train of gears including the gear 75 on the cam shaft 56. This gear meshes with a driving pinion 76 meshing with a further and idler gear 77, the latter in turn meshing with another idler gear 78 and adapted to be driven from the pinion 79 on the shaft of motor 57. This constitutes the direct train for driving the cam at its higher velocity, but provision is made for disengaging the driving pinion 79 from its idler 78 so that through a further train the latter gear 78 may be driven indirectly from the pinion 79 and the rotational velocity of the train reduced to the desired degree with consequent reduction in the rotational velocity of the cam.

For example, an idler gear 81 is mounted upon a movable arm or plate 82 which, when suitably moved, is designed to engage the idler 81 with the pinion 79, and at the same time disengage the latter from the idler 78. The arm to this end moves above the pivot 83, and it constitutes also one arm of a bell crank whose other arm 84 extends downwardly, as indicated.

There is also arranged to rotate with the idler 81 a pinion 85 meshing with a further and idler gear 86 carried by the arm 82 and bearing a pinion 86' in engagement with idler gear 78. Thus, when the arm 82 is rocked downwardly, being provided for this purpose with the accommodating slot 87 engaging the guide pin 88, a slower rotational movement is imparted to the cam than when the other train is in engagement with the driving pinion 79 of motor 57.

Instead of the particular cam with stepped portions shown, any desired combination of cams may be utilized as well as individually rotatable cams rather than a single cam disk as hereinbefore set forth. For example, as indicated in Fig. 7, the one pilot valve 90, operating the speed-changing mechanism, may be controlled directly from a stepped cam 91 having but a single lift as shown, while individual cams 92, 93, 94 and 95 rotating in unison with the cam 91 may serve to control directly a series of pilot valves 96, 97, 98 and 99 for effecting a succession of operations.

Moreover, instead of a cam being utilized for the control of the pilot valves, a crank movement 100, Fig. 6, may operate to move the rocker arm 101 carrying tappets for engagement with the stems of the pilot valves 102, 103, 104 and 105.

Provision is made, furthermore, for holding the respective trains in their different positions, as through the arm 84 of the bell crank, there being for this purpose pivotally attached to its lower end a holding plate or latch member 110 having its outer end adapted to rest upon a stop pin 111 and its inner end provided with a finger 112 spring-drawn by the spring 113 to urge arm 82 in a direction to hold the gears 78 and 79 in mesh. The spring 113, furthermore, tends to retain the hold plate or latch member 110 along its lower surface in intimate contact with the upper surface of one arm 115 of a bell crank having the latch surface or shoulder 116 adapted under certain conditions to slip behind the shoulder 117 of the latch member 110, the arm 115 being limited in its upward movement through engagement of an adjustable pin 118 thereof with the stop 119.

Figure 2:
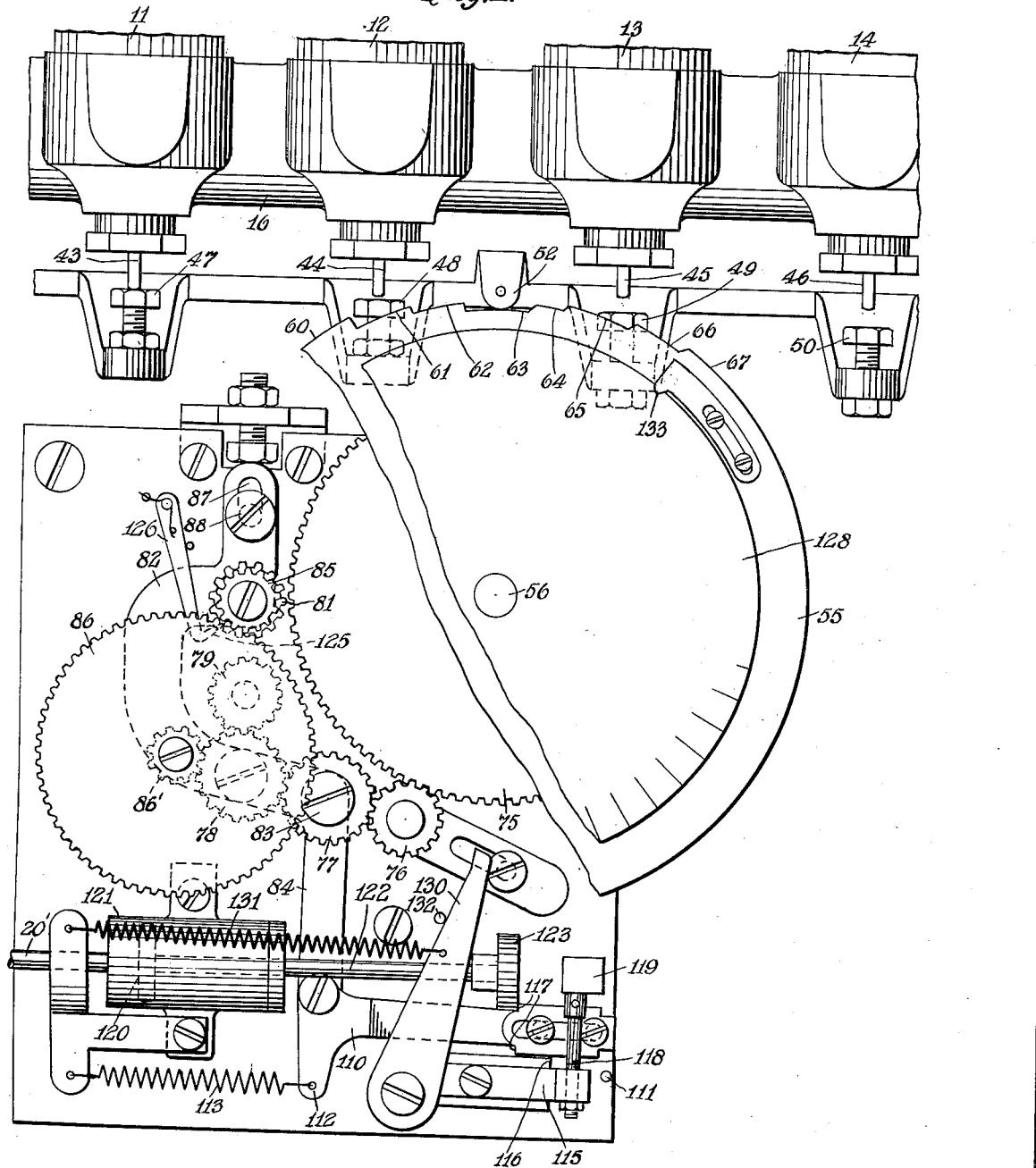
Figs. 2 and 3 are fragmentary views, on an enlarged scale and with portions broken away, of the cam and drive mechanism for effecting its rotation at different velocities, Fig. 2 showing the arrangement of the gearing for the high-speed drive and Fig. 3 for the low-speed drive.
Figure 3:
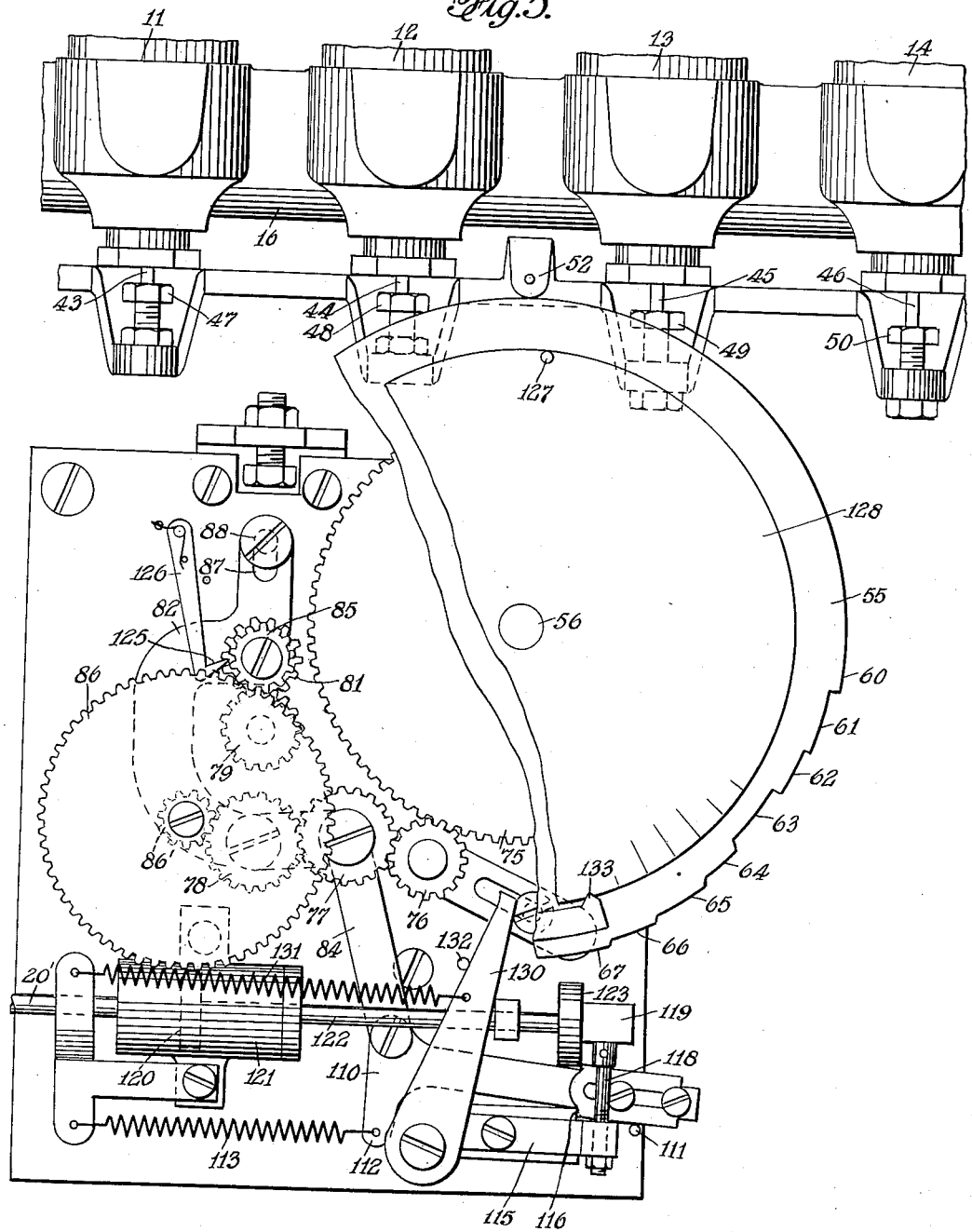

In the position shown in Fig. 2, the train is set for driving the cam at its higher velocity and the various parts are positioned to maintain the proper train in mesh with the driving pinion 79. However, as soon as the pilot valve 14 is opened, fluid will be available, as through the pipe 20', to actuate a piston 120 reciprocable in a cylinder 121 for moving outwardly the rod 122.

At its outer end the rod 122 carries a head or collar 123 which is adapted for engagement with the said shoulder 117 to prevent retraction normally of the latch member 110 and, when the piston is moved outwardly, to move said latch member with it in opposition to the spring 113. The stop 119 limits the outward movement of said collar. The movement of the latch member thus effected operates the train-carrying bell crank, through rocking of its other arm 84, to disengage pinion 79 from gear 78 and also simultaneously to bring gear 81 into mesh with said driving pinion 79 for introducing the slower motion train.

At the same time the shoulder 117 will ride past the latching surface 116 causing the latch member 110 to be locked thereby and maintain the slow-motion train in operation.

Provision is also made during this depression of the train-carrying arm 82 of the bell crank to prevent back rotation of the gear 81. For example, engagement therewith of a spring-urged tooth 125 carried on an arm 126 is effected, the teeth of said gear wheel being engaged by the tooth immediately as the gear descends. Furthermore, through its descent and engagement aforesaid, a slight rotation or advance of the gear 81 is effected, accelerating the cam during the transitional period.

When it is desired to again return to the high rotational velocity of the cam, this may be effected through the action of a pin 127 which is secured to a graduated disc 128 adjustably mounted on and rotatable with the said cam. As the said pin rotates with the cam, it eventually engages the arm 130 of the bell crank having the other arm 115 and spring drawn by a tension spring 131 against a stop 132. The movement thus imparted by the pin to the bell crank in opposition to the said spring 131 causes latch member 110 to be released from the latching surface 116, permitting thereby the spring 113 to retract the latch member and moving by bell crank arm 84.

This restores the engagement between driving pinion 79 and gear wheel 78 for the higher rotational velocity of the cam-driving pinion 79 and gear wheel 81 having been disengaged simultaneously with the re-engagement of the idler 78 with said pinion.

The graduations of the disk 128 may be extended to the circumference for convenient reference to a suitable mark or index element 133 on the cam face, and in accordance with the period set will be the duration of the lower rotational velocity of the cam and consequently the extension of the period of activity conforming thereto.

In effecting the calibration of the disk, it is necessary to find the angle in degrees thereon to correspond to a given time of total revolution of the cam, and the following formula has been derived to this end.

Let $t_1$ denote time in minutes of operation at high speed

Let $t_2$ denote time in minutes of operation at low speed

Let T denote total time of one revolution, $=t_2+t_1$

Let S denote angular velocity (R. P. M.) at high speed

Let $a$ denote ratio of high speed to low speed

Let R denote time by which T exceeds minimum possible time of 1/S, or time by which cycle is prolonged by interposition of low-speed interval, so that $T=1/S+R$ Let L denote angle through which cam and disc revolve while rotating at the lower speed, or through time interval $t_2$.

Then:

$$t_2 = \frac{L}{360} \div \frac{S}{a} = \frac{aL}{360S}$$

and $$t_1 = \frac{360-L}{360} \div S = \frac{360-L}{360S}$$

and $$T = t_2 + t_1 = \frac{aL+360-L}{360S}$$

$$aL - L + 360 = 360ST$$

$$L(a-1) = 360(ST-1)$$

$$L = 360\frac{ST-1}{a-1}$$

$$= 360\frac{S(1/S+R)-1}{a-1}$$

$$= 360\frac{RS}{a-1}$$

In practice it has been found that satisfactory results have been obtained with a value of 10 for $a$ and $\frac{1}{6}$ for S. Substituting these values in the formula, we have $$L = 360 \frac{R/6}{9} = \frac{360}{54} R = 6\frac{2}{3} R$$

With the constants chosen as above, a time of one minute of the total revolution represents an angle of $6\frac{2}{3}$ degrees or 1/54 of the total circumference of 360 degrees. Thus, if the circumference of the disc be graduated into a dial having $6\frac{2}{3}$ degree spaces, each space will represent one minute of total time.

In a similar manner the graduation for any chosen values of S, $a$ and T may be obtained.

I claim:

1. Time-cycle controller means, comprising pilot means, devices controlled thereby, means for actuating the pilot means, rotatable cam means controlling said actuating means, means to rotate said cam means substantially continuously during a complete cycle, a plurality of speed trains intermediate the rotating means and the cam means, and means movable with the latter for determining automatically the duration of engagement of one of the speed trains with the cam.

2. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, and means movable with the latter for determining automatically the duration of engagement of one of the speed trains with the cam.

3. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, and means carried by the latter for determining automatically the duration of engagement of one of the speed trains with the cam.

4. Time-cycle controller means, comprising pilot means, devices controlled thereby, mechanical means for actuating the pilot means, rotatable cam means controlling said mechanical actuating means, a constant speed motor to rotate said cam means substantially continuously during a complete cycle, a plurality of speed trains intermediate the rotating means and the cam means, and means movable with the latter for determining automatically the duration of engagement of one of the speed trains with the cam.

5. Time-cycle controller means, comprising a plurality of pilot elements, devices controlled thereby, mechanical means for actuating the pilot elements, means to by-pass one of the pilot elements for the purpose of initiating the cycle, rotatable cam means controlling said mechanical actuating means, means to rotate said cam means substantially continuously during a complete cycle, a plurality of speed trains intermediate the rotating means and the cam means, and means movable with the latter for determining automatically the duration of engagement of one of the speed trains with the cam.

6. Time-cycle controller means, comprising pilot means, devices controlled thereby, mechanical means for actuating the pilot means, a cam controlling said mechanical actuating means and having two sets of adjacent control portions with intermediate low portion, means to rotate said cam means substantially continuously during a complete cycle, a plurality of speed trains intermediate the rotating means and the cam means, and means movable with the latter for determining automatically the duration of engagement of one of the speed trains with the cam.

7. Time-cycle controller means, comprising pilot means, devices controlled thereby, mechanical means for actuating the pilot means, a cam controlling said mechanical actuating means and having two sets of adjacent control portions with intermediate low portion, the sets of control portions being in reverse order, means to rotate said cam means substantially continuously during a complete cycle, a plurality of speed trains intermediate the rotating means and the cam means, and means movable with the latter for determining automatically the duration of engagement of one of the speed trains with the cam.

8. Time-cycle controller means, comprising pilot means, devices controlled thereby, mechanical means for actuating the pilot means, rotatable cam means controlling said mechanical actuating means, means to rotate said cam means substantially continuously during a complete cycle, a low speed train and a high speed train intermediate the cam-rotating means and the cam, and means carried by the cam for determining automatically the duration of engagement of the slower train with the cam.

9. Time-cycle controller means, comprising pilot means, devices controlled thereby, mechanical means for actuating the pilot means, rotatable cam means controlling said mechanical actuating means, means to rotate said cam means subtantially continuously during a complete cycle, a plurality of speed trains intermediate the rotating means and the cam means, shifting mechanism for changing the engagement of one train with the cam means, and means carried by said cam means for engaging the shifting mechanism.

10. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, a calibrated disk rotatable with the cam and adjustable relatively thereto, and means carried thereby for engaging the shift mechanism.

11. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, a calibrated disk rotatable with the cam and adjustable relatively thereto, and engaging means extending from said calibrated disk for effecting the gear train change.

12. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, a calibrated disk rotatable with the cam and adjustable relatively thereto, and a pin extending outwardly from said calibrated disk for engagement with the shift mechanism.

13. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, and means for momentarily accelerating the speed of the cam during the shifting interval.

14. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, and means for momentarily accelerating the speed of the cam during the shifting interval and for securing a train against backward rotation during the shifting interval.

15. Time-cycle controller means, comprising pilot means, devices controlled thereby, mechanical means for actuating the pilot means, rotatable cam means controlling said mechanical actuating means, means to rotate said cam means substantially continuously during a complete cycle, a plurality of speed trains intermediate the rotating means and the cam means, shifting mechanism for changing the engagement of one train with the cam means, and a spring-urged pawl adapted to engage with the teeth of a gear wheel of one of the trains as said gear is shifted to effect a change of engagement.

PERRY A. BORDEN.